US011377969B2

United States Patent
McCaffrey

(10) Patent No.: US 11,377,969 B2
(45) Date of Patent: Jul. 5, 2022

(54) EXTENDED ROOT REGION AND PLATFORM OVER-WRAP FOR A BLADE OF A GAS TURBINE ENGINE

(71) Applicant: United Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 103 days.

(21) Appl. No.: 16/784,431

(22) Filed: Feb. 7, 2020

(65) Prior Publication Data

US 2021/0246791 A1    Aug. 12, 2021

(51) Int. Cl.
*F01D 5/30* (2006.01)
*F01D 5/28* (2006.01)

(52) U.S. Cl.
CPC ........... *F01D 5/3084* (2013.01); *F01D 5/282* (2013.01); *F01D 5/284* (2013.01); *F01D 5/3007* (2013.01); *F01D 5/3092* (2013.01); *F05D 2220/32* (2013.01); *F05D 2230/60* (2013.01); *F05D 2240/80* (2013.01); *F05D 2300/6033* (2013.01)

(58) Field of Classification Search
CPC .......... F01D 5/282; F01D 5/284; F01D 5/288; F01D 5/3084; F01D 5/3007; F01D 5/3092; F05D 2240/80; F05D 2230/60; F05D 2300/6033; F05D 2220/32
See application file for complete search history.

(56) References Cited

U.S. PATENT DOCUMENTS

| | | | | |
|---|---|---|---|---|
| 4,343,593 A | * | 8/1982 | Harris | F01D 5/282 416/193 A |
| 4,453,890 A | * | 6/1984 | Brantley | F01D 5/3007 416/220 R |
| 6,132,175 A | * | 10/2000 | Cai | F01D 5/284 403/29 |
| 8,777,583 B2 | | 7/2014 | Darkins, Jr. et al. | |
| 8,794,925 B2 | * | 8/2014 | McCaffrey | F01D 5/284 416/219 R |
| 8,980,031 B2 | * | 3/2015 | Dambrine | B29C 70/461 156/148 |
| 9,611,746 B2 | * | 4/2017 | Luczak | F01D 5/3084 |
| 10,132,170 B2 | | 11/2018 | Garcia-Crespo et al. | |
| 10,180,071 B2 | | 1/2019 | Freeman et al. | |
| 10,202,853 B2 | * | 2/2019 | Kleinow | F01D 5/284 |
| 10,287,897 B2 | * | 5/2019 | Paige, II | F01D 5/3007 |

(Continued)

FOREIGN PATENT DOCUMENTS

CH      707728 A2      9/2014
WO   2015080781 A2    6/2015

OTHER PUBLICATIONS

EP Search Report dated Jul. 21, 2021 issued for corresponding European Patent Application No. 21155748.3.

*Primary Examiner* — Topaz L. Elliott
(74) *Attorney, Agent, or Firm* — Bachman & LaPointe, P.C.

(57) ABSTRACT

A rotor blade for a gas turbine engine including an inner ply layer group that at least partially defines a base of a root region; a platform around the inner ply layer group that at least partially defines the base; and a platform over-wrap around the platform, the platform over-wrap at least partially defines the base.

18 Claims, 7 Drawing Sheets

(56) References Cited

U.S. PATENT DOCUMENTS

| | | |
|---|---|---|
| 10,443,409 B2 | 10/2019 | Sippel et al. |
| 10,605,100 B2 * | 3/2020 | Kittleson ............... F01D 5/3084 |
| 2012/0051920 A1 * | 3/2012 | McCaffrey .............. F01D 5/282 |
| | | 416/219 R |
| 2012/0267039 A1 * | 10/2012 | Dambrine ............. B29C 70/461 |
| | | 156/148 |
| 2013/0011271 A1 * | 1/2013 | Shi ........................... F01D 5/28 |
| | | 416/230 |
| 2013/0064668 A1 * | 3/2013 | Paige, II ............... F01D 5/3007 |
| | | 416/219 R |
| 2013/0247586 A1 * | 9/2013 | Luczak ................... F01D 5/282 |
| | | 60/805 |
| 2016/0138406 A1 * | 5/2016 | Freeman ............... F01D 5/3084 |
| | | 416/220 R |
| 2016/0222800 A1 * | 8/2016 | Kleinow ................. F01D 5/284 |
| 2016/0230568 A1 * | 8/2016 | Sippel ..................... F01D 9/041 |
| 2017/0218506 A1 * | 8/2017 | Lee ....................... C04B 41/009 |
| 2018/0119549 A1 * | 5/2018 | Vetters .................... F01D 5/147 |
| 2018/0171806 A1 | 6/2018 | Freeman et al. |
| 2018/0340429 A1 * | 11/2018 | Kittleson ............... F01D 5/3007 |
| 2019/0084890 A1 * | 3/2019 | Weaver ................... F01D 5/282 |
| 2020/0392856 A1 * | 12/2020 | McCaffrey ............ F01D 5/3007 |
| 2021/0102468 A1 * | 4/2021 | McCaffrey .............. F01D 5/284 |
| 2021/0246800 A1 * | 8/2021 | McCaffrey .............. F01D 5/288 |

* cited by examiner

EXTENDED ROOT REGION AND PLATFORM OVER-WRAP FOR A BLADE OF A GAS TURBINE ENGINE

BACKGROUND

This application relates generally to a gas turbine engine blade and more specifically to the root region of composite blades.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. Air is compressed in various fan and compressor stages by rotor blades which cooperate with stator vanes. Fan air provides bypass propulsion thrust while compressor air is mixed with fuel and ignited for generation of hot combustion gases from which energy is extracted by a turbine section which powers the compressor and fan sections.

The turbine section often includes blades formed from ceramic matrix composites ("CMC") which may have relatively low interlaminar properties such that attachment regions between a platform region and airfoil region may be subject to significant interlaminar stress. Integrating the platform may be a challenge in transmitting the centrifugal load into the root region. Loss of bond has been shown analytically to cause distortions which will further increase the platform loads, leading to a cascading structural load increase.

SUMMARY

A rotor blade for a gas turbine engine according to one disclosed non-limiting embodiment of the present disclosure includes an inner ply layer group that at least partially defines a base of a root region; a platform around the inner ply layer group that at least partially defines the base; and a platform over-wrap around the platform, the platform over-wrap at least partially defines the base.

A further embodiment of any of the foregoing embodiments of the present disclosure includes that the inner ply layer group at least partially defines an airfoil.

A further embodiment of any of the foregoing embodiments of the present disclosure includes that the inner ply layer group, the platform, and the platform over-wrap defines a flared surface of the root region of the rotor blade.

A further embodiment of any of the foregoing embodiments of the present disclosure includes that the inner ply layer group and the platform over-wrap are manufactured of a ceramic matrix material.

A further embodiment of any of the foregoing embodiments of the present disclosure includes that the inner ply layer group, the platform, and the platform over-wrap comprise a ceramic matrix material.

A further embodiment of any of the foregoing embodiments of the present disclosure includes that the platform comprises at least two platform sections which, in combination, define the platform and surround the inner ply layer group.

A further embodiment of any of the foregoing embodiments of the present disclosure includes that the platform over-wrap defines attachment surface an attachment surface at which a disk interfaces.

A further embodiment of any of the foregoing embodiments of the present disclosure includes that an attachment surface defines a zone of compression through the attachment ply layer group and into said inner ply layer group.

A further embodiment of any of the foregoing embodiments of the present disclosure includes that the zone of compression is defined along a line that is oriented at 30-50 degrees with respect to the blade root centerline.

A further embodiment of any of the foregoing embodiments of the present disclosure includes a point on a centerline of the blade is defined by a line perpendicular to a point in the zone of compression, the base of the root region defined below the point.

A further embodiment of any of the foregoing embodiments of the present disclosure includes that the point on the zone of compression is a central point on the line that defines the zone of compression.

A further embodiment of any of the foregoing embodiments of the present disclosure includes that the point on the zone of compression is a most inboard point on the line that defines the zone of compression.

A further embodiment of any of the foregoing embodiments of the present disclosure includes that the base is perpendicular to a centerline of the blade.

A further embodiment of any of the foregoing embodiments of the present disclosure includes that an outer surface of the platform wrap below an attachment surface is parallel to the centerline.

A further embodiment of any of the foregoing embodiments of the present disclosure includes an outer surface of the platform wrap below an attachment surface forms an inward angle toward the centerline of up to about 10 degrees.

A method of manufacturing a rotor blade of a gas turbine engine according to one disclosed non-limiting embodiment of the present disclosure includes assembling a platform around an inner ply layer group, the platform and the inner ply layer group at least partially forming a base of a root region; and wrapping the platform with a platform over-wrap, the platform over-wrap at least partially forming the base.

A further embodiment of any of the foregoing embodiments of the present disclosure includes forming the platform over-wrap as a continuous band.

A further embodiment of any of the foregoing embodiments of the present disclosure includes forming an attachment surface with the platform over-wrap.

A further embodiment of any of the foregoing embodiments of the present disclosure includes applying a silicon plasma spray to form a machinable layer on the attachment face.

A further embodiment of any of the foregoing embodiments of the present disclosure includes forming a flared surface with the platform, the inner ply layer group, and the platform over-wrap.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
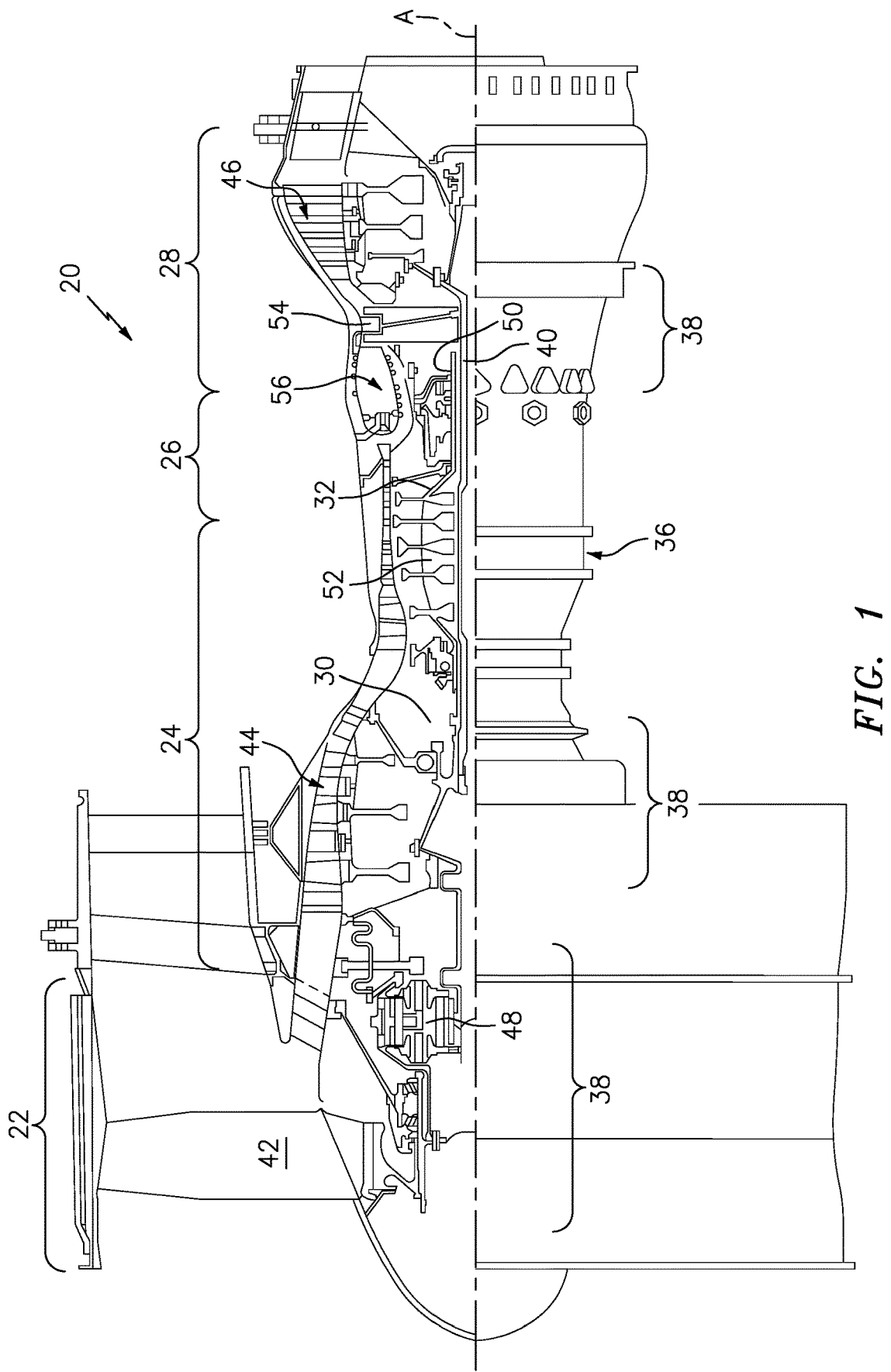
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a high temperature core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
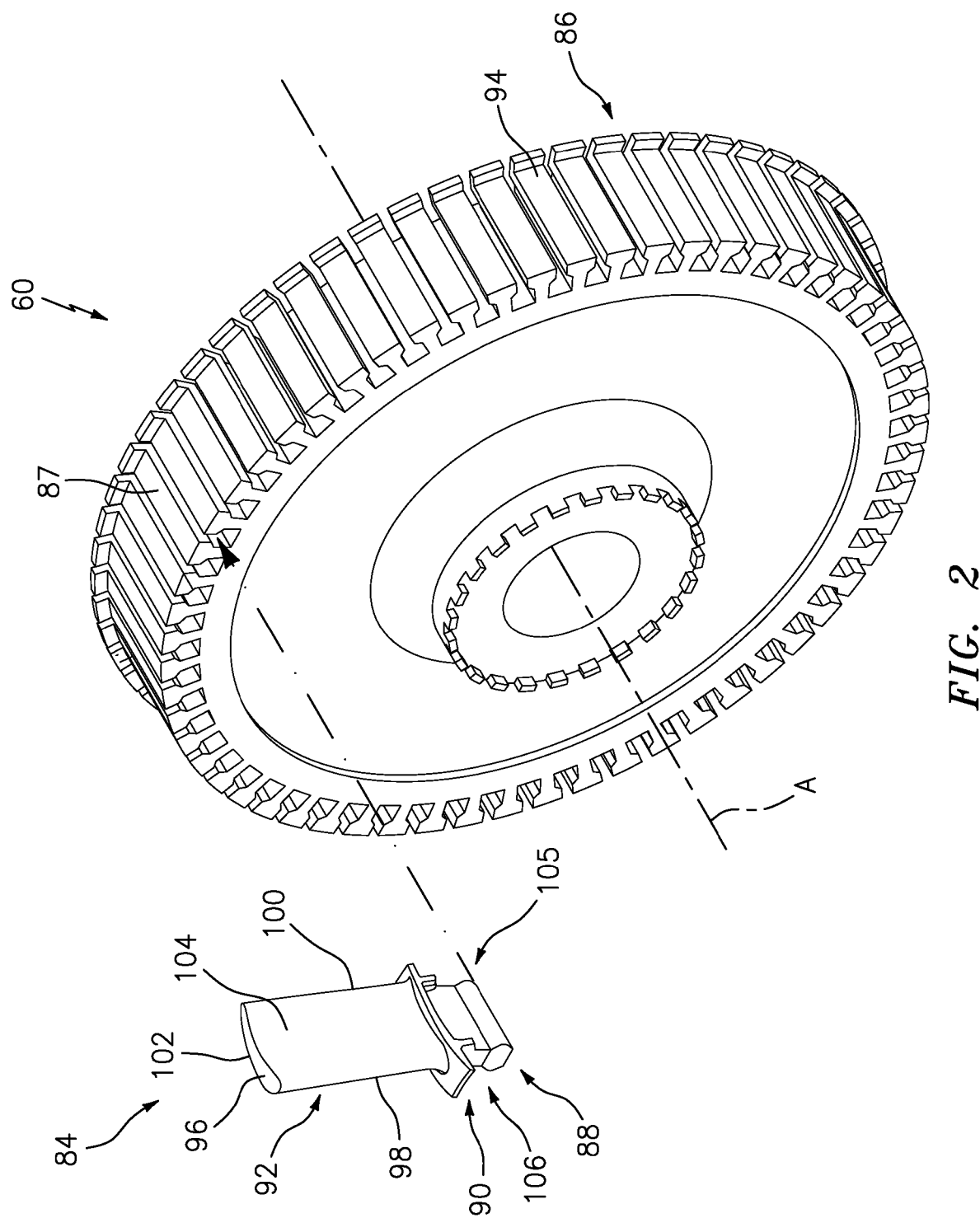
FIG. 2 is an exploded view of a rotor assembly with a single representative ceramic matrix composite turbine blade.

With reference to FIG. 2, a rotor assembly 60 such as a turbine rotor assembly includes an array of blades 84 (one shown) circumferentially disposed around a disk 86. The disk 86 may be subtractive or additive manufactured of nickel-based super alloys that operate in high temperature environments, such as, for example, environments typically encountered by aerospace and gas turbine engine hot section components. In some embodiments, the nickel-based alloy may be Inconel 718, Waspaloy, IN-100.

Each blade 84 includes a root region 88, a platform 90 and an airfoil 92. The platform 90 separates a gas path side inclusive of the airfoil 92 and a non-gas path side inclusive of the root region 88. Although the platform 90 is illustrated as integral in the illustrated embodiment, other geometries in which the platform 90 is a separate component may alternatively be utilized. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Each blade root region 88 is received within one blade slot 94 in a rim 87 of the disk 86 such that the airfoil 92 extends therefrom and the platform 90 at least partially protects the rim 87. In the illustrated embodiment, a blade 84 is disclosed in detail, however other composite components which require attachment such as the root region 88 to include but not be limited to vanes, blade outer air seals, struts, etc., will also benefit herefrom.

Each blade 84 may be manufactured of a composite material such as ceramic matrix composite (CMC) or an organic matrix composite (OMC) material. The composite materials typically include prepreg ceramic plys that include prepreg ceramic fiber tows. The tows in each ply are arranged adjacent to one another in a planar orientation such that each ply has a unidirectional orientation. Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3$/$Al_2O_3$), organic matrix composite (e.g. carbon fiber epoxy) or combinations thereof. The CMC may have increased elongation, fracture toughness, thermal shock, dynamic load capability, and anisotropic properties as compared to a monolithic ceramic structure. Other CMC materials may utilize tackified ceramic fabric/fibers whereby the fibers have not been infiltrated with matrix material, 3D weave architectures of dry fabrics, and others. Although CMCs are primarily discussed in the disclosed embodiment, other such non-metallic materials may also be utilized to form the component.

Manufacture of the blade 84 typically includes laying up pre-impregnated composite fibers within a matrix material (prepreg) to form the geometry of the part (pre-form), autoclaving and burning out the pre-form, infiltrating the burned-out pre-form with the melting matrix material, then final machining and treatments of the pre-form. Infiltrating the pre-form may include depositing the ceramic matrix out of a gas mixture, pyrolyzing a pre-ceramic polymer, chemically reacting elements, sintering, generally in the temperature range of 1700-3000 F (925-1650 C), or electrophoretically depositing a ceramic powder. With respect to airfoils, the composites may be located over a metal spar and form only the outer surface of the airfoil.

The blade 84 may be loaded primarily in one direction (radial pull) that have been created in ceramic matrix composite (CMC) or organic matrix composite (OMC) material with relatively direct ply orientations having minimal bending. The root region 88 may include a flared region 105 below a neck 106. The flared region 105 may alternatively at least partially form a teardrop, fir-tree, or other shape of the root region 88 to resist the radial pull during engine operation.

Figure 3:
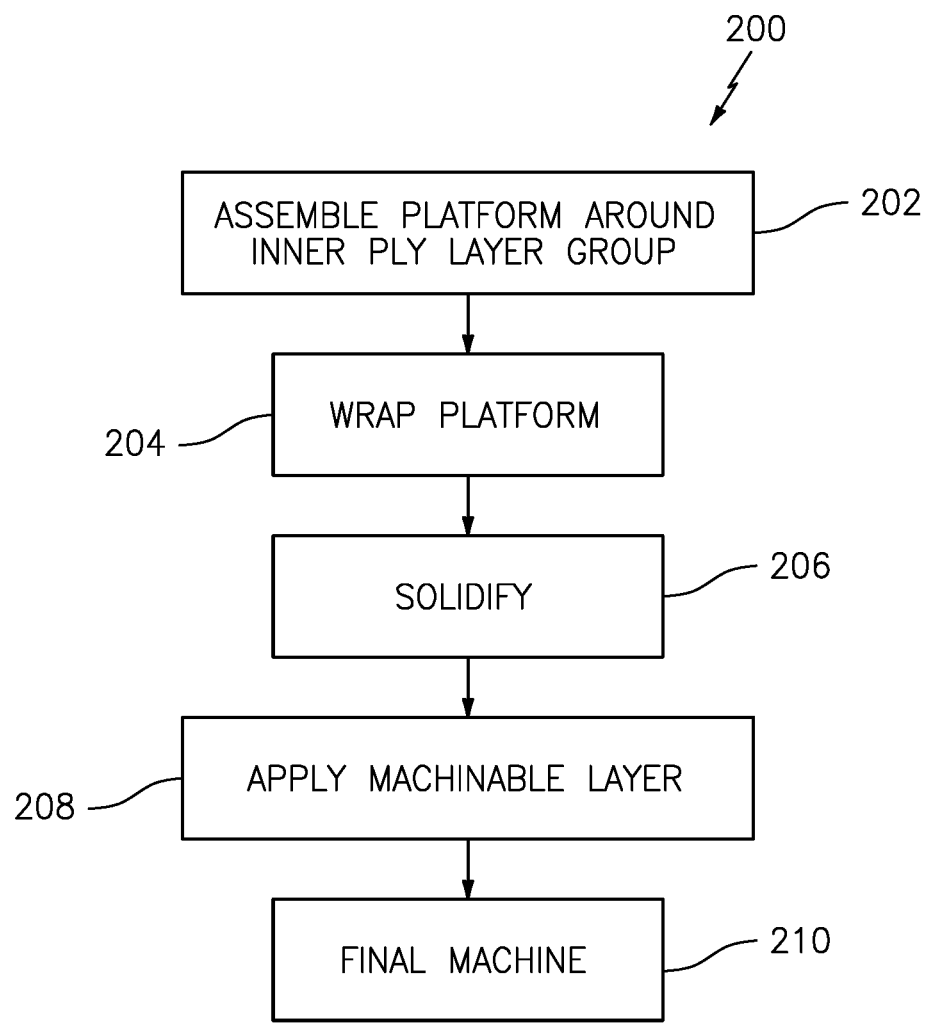
FIG. 3 is a method of assembling a blade with an extended root region and platform wrap according to one embodiment.
Figure 4:
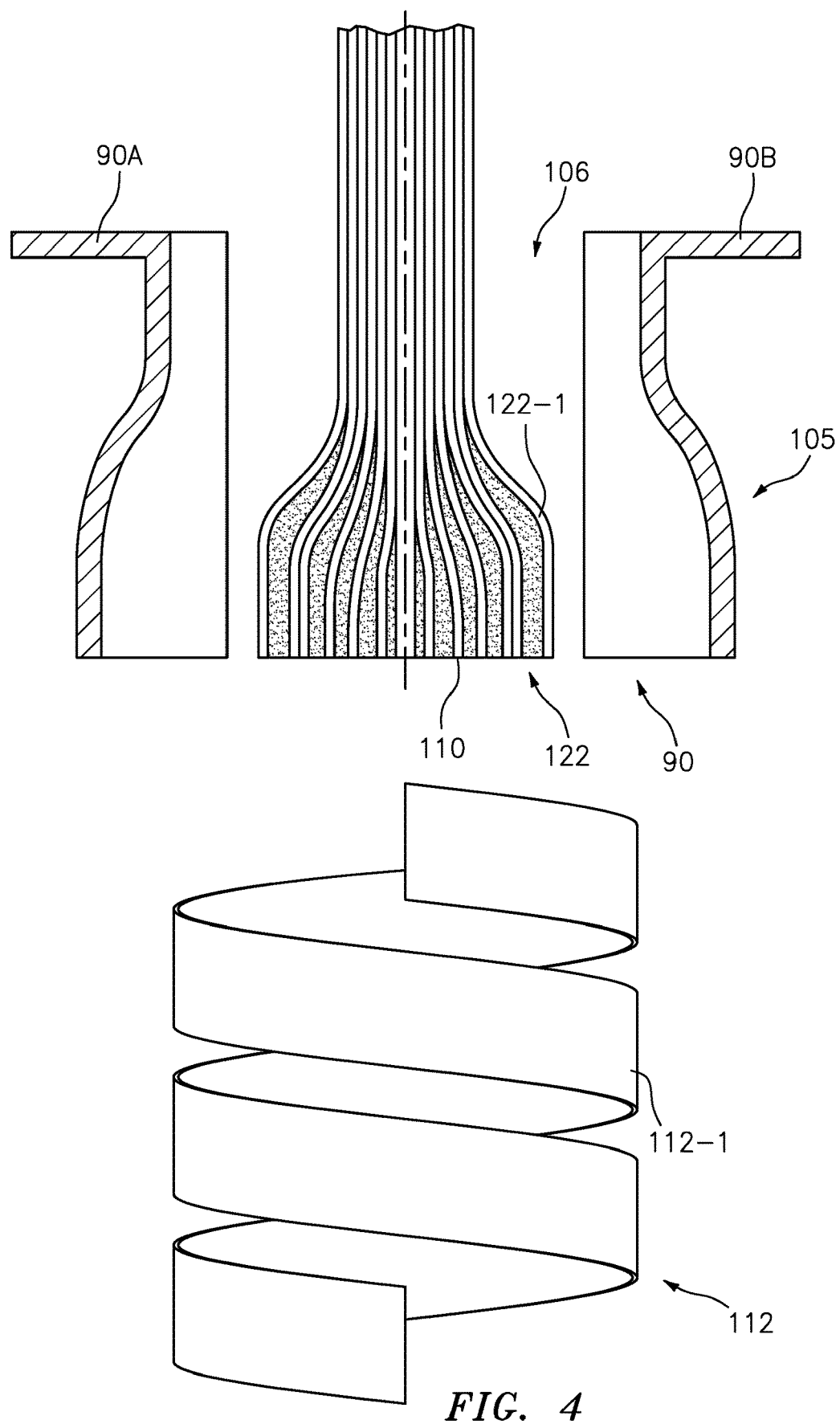
FIG. 4 is an exploded view of the extended root region and platform wrap.

With reference to FIG. 3, a method 200 of manufacturing the root region 88 initially includes assembling the platform 90 around an inner ply layer group 122 (FIG. 4) as shown in step 202 that at least partially forms the flared region 105 that extends to a base 110 which is the innermost end of the blade 84. The inner ply layer group 122 may continue radially outward with respect to the engine axis to at least partially form the airfoil 92 (FIG. 2).

The platform 90 may be assembled as a multiple of platform sections 90A, 90B (FIG. 4) that surround an outermost ply 122-1 of the inner ply layer group 122. The platform 90 also at least partially forms the lay-up of the flared region 105. Although illustrated as formed in two section that are assembled together, any number of sections may be utilized. The platform sections 90A, 90B may be formed as an integral woven ply layup that is later solidified, pre-ceramics which are later solidified, or preformed sections which have already been solidified. The platform sections 90A, 90B at least partially form the base 110 of the root region 88.

Figure 5:
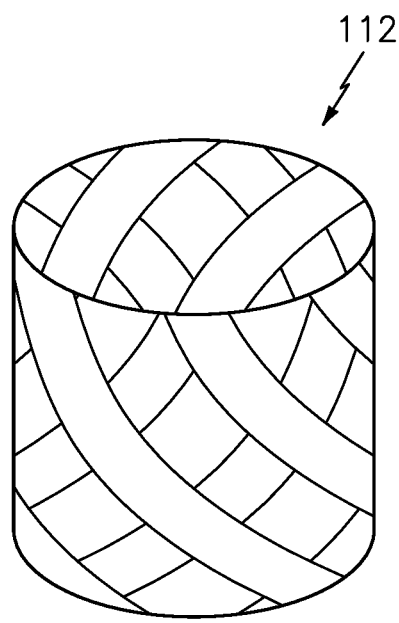
FIG. 5 is a perspective view of a tubular platform overwrap according to one embodiment.

Once assembled to the inner ply layer group 122, the platform sections 90A, 90B are then wrapped with a platform over-wrap 112 (FIG. 3, step 204). The platform over-wrap 112 may be formed as a continuous band that extends to the base 110 of the root region. In one example, the platform over-wrap 112 is a woven, tape, or knitted ceramic fabric such as silicon carbide fabric, silicon carbide-carbon fabric or other such material that may be pre-impregnated with a matrix precursor such as a polycarbosilane pre-ceramic matrix precursor or other liquid resin. Alternatively, the platform over-wrap 112 may also be a tubular three-dimensional weave (FIG. 5) which fits over the platform sections 90A, 90B.

Figure 6:
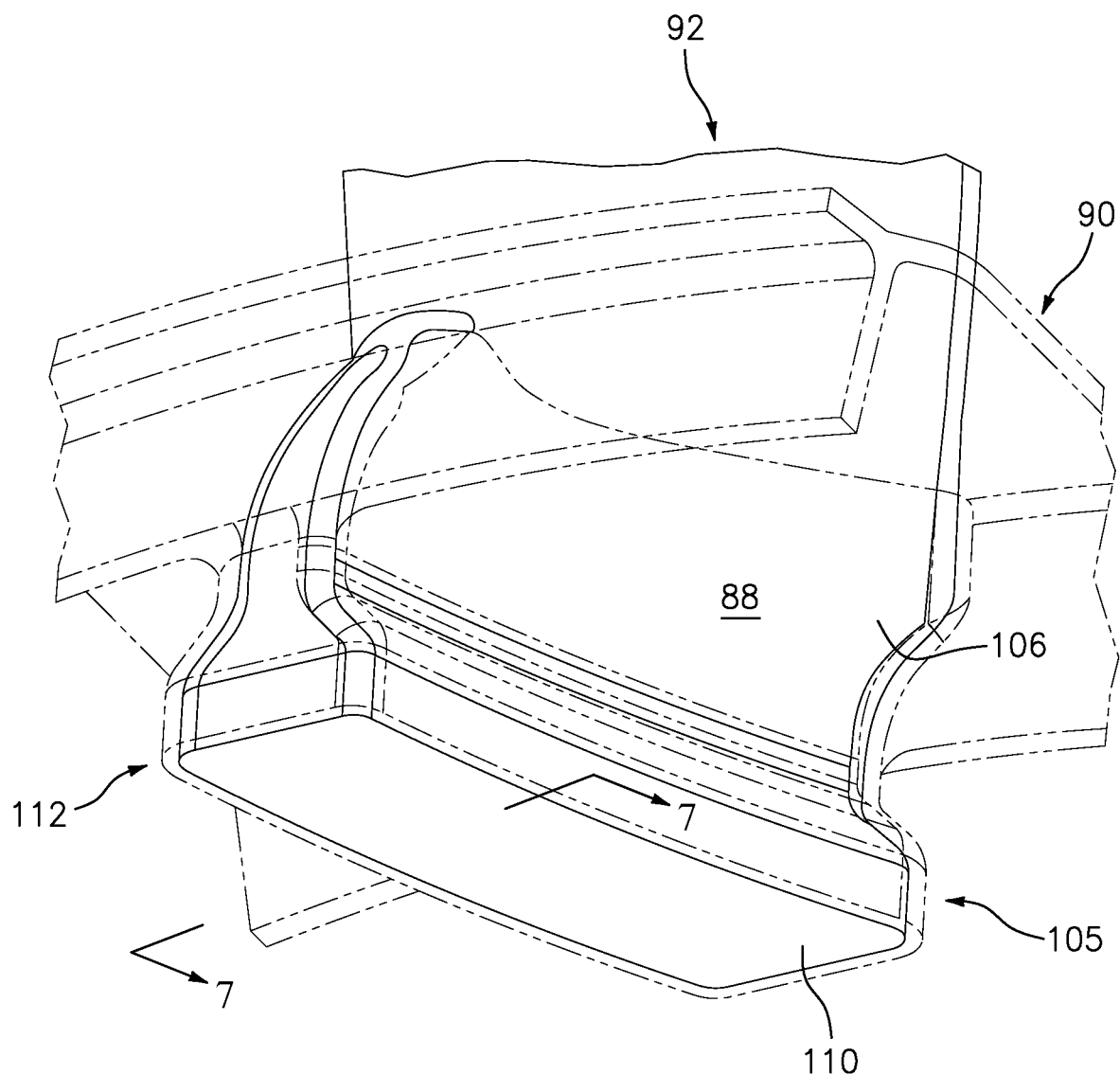
FIG. 6 is a perspective view of a root for a blade according to one embodiment.

An outermost ply 112-1 of the platform over-wrap 112 forms an attachment surface 130 and extends to the base 110 of the root region 88. Extension of the platform over-wrap 112 over the full attachment surface 130 (FIGS. 6 and 7) to the base 110 significantly increases the structural load path and facilitates control of the stresses in the platform 90 even if the platform 90 is not fully bonded, to the inner ply layer group 122.

Next, the inner ply layer group 122, the platform sections 90A, 90B and the platform over-wrap 112 are solidified (FIG. 3, step 206). The solidifying process may be performed via a pyrolysis tool, such as a mold that is located within a furnace. The heat from the furnace converts the matrix precursors to a solid ceramic matrix composite that solidifies and bonds the layers together to form the root region 88. The heat from the furnace may also provide for final solidification of the platform sections 90A, 90B if initially assembled as pre-ceramics or other "green" level components.

Next, the outermost ply 112-1 of the platform over-wrap 112 may be silicon plasma sprayed to form a machinable layer 108 (FIG. 3, step 208) at least over the attachment surface 130. The machinable layer 108 permits high tolerance final machining (FIG. 3, step 210) of the attachment surface 130.

Figure 7:
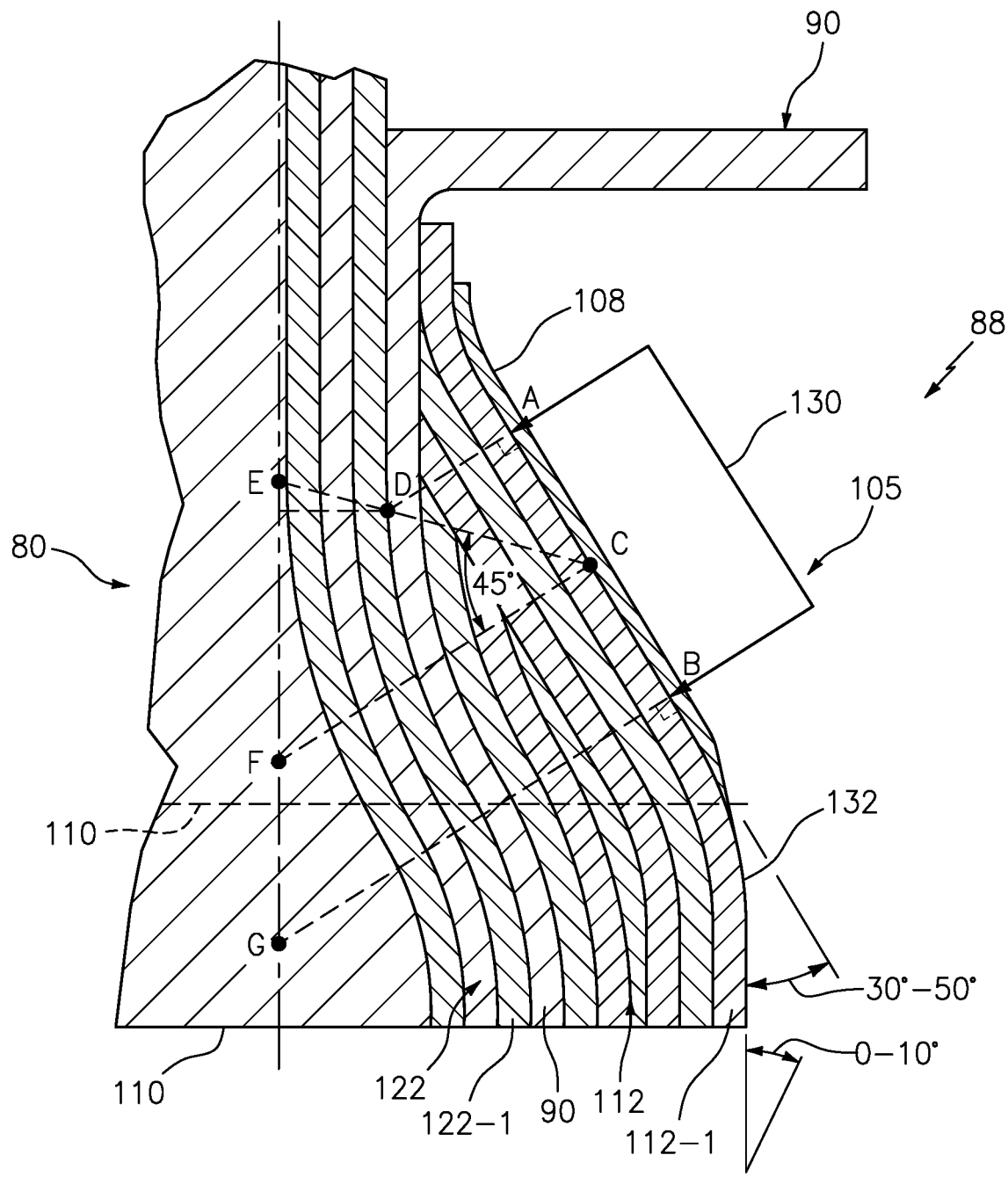
FIG. 7 is a sectional view of the blade root along line 6-6 in FIG. 5.

With reference to FIG. 7, the root region 88 sandwiches the platform 90 between the platform over-wrap 112 and the inner ply layer group 122 such that high interlaminar tensile/shear (ILT/ILS) regions of the root region 88 are contained within regions of compressive stress in the root region 88 to increase the total allowable ILT/ILS stress.

The inner ply layer group 122 includes an outermost ply 122-1 to which the platform sections 90A, 90B are assembled. The assembled platform 90 is then wrapped with the platform over-wrap 112 to define the root region 88. Applicant has determined that the root region 88 below the attachment surface 130 is particularly important to blade strength. Analysis has shown that fully wrapping the platform 90 with the platform over-wrap 112 to extend to the base 110, permits the root region 88 to operate without radial support from the blade neck region 106. Thus, extending the root region 88 inward toward the engine axis, and maintaining a full, uninterrupted platform over-wrap 112 to the base 110, significantly increases the structural capability of the root region 88.

In one embodiment, the outermost ply 112-1 of the platform over-wrap 112 may include the machinable layer 108 over the length of the attachment surface 130. In this embodiment, an outer surface 132 of the platform wrap 112-1 inboard of the attachment surface 130 may be parallel to the centerline of the blade. Alternatively, the outer surface 132 of the platform wrap 112-1 inboard of the attachment surface 130 may form an inward (toward the blade root centerline) angle of up to about 10 degrees. That is, the outer surface 132 of the platform wrap 112-1 may taper inward toward the blade centerline by up to about 10 degrees for relatively smaller engines with a lesser number of blades.

The attachment surface 130 of the flared region 105 is represented along line AB. The attachment surface 130 is the surface of the flared region 105 upon which a disk attachment tooth interfaces of the blade slot 94 in a rim 87 of the disk 86 is in contact (FIG. 2). The attachment surface 130 along line AB may be considered a "zone of compression" that extends through the platform over-wrap 112, the platform 90, and into the inner ply layer group 122 when the engine is operating and the blade 84 is subjected to centrifugal forces. The "zone of compression" is represented herein via a typical bolted joint methodology to calculate the spring rate of the stack in compression. The outermost ply 122-1 of the inner ply layer group 122 remains generally parallel to the blade root centerline from point D then transitions into the flared region 105 such that the plys radially inboard of line CE remain in compression during engine operation. Per the bolted joint methodology, a 45 degree angle defined from line CF defines line CD to locate point D and thus the outermost ply 112-1 which is to be parallel to the blade centerline.

In this embodiment, the attachment surface 130 may be outwardly oriented about 30-50 degrees with respect to the blade root centerline.

A midpoint of line AB is represented herein by point C. Line CF is perpendicular to line AB and is extended perpendicular from line AB to intersect the blade root centerline at point F. Line BG is perpendicular to line AB and parallel to line CF. Line BG extends perpendicular from line AB to intersect the blade root centerline at point G. Point G defines the most inboard point of the zone of compression.

Applicant has determined that the base 110 should be located radially inboard of at least point F (illustrated in phantom), and alternatively inboard of point G, along the blade centerline. That is, the base 110 is the bottom most surface of the root region 88, the platform 90 and the platform over-wrap 112.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A rotor blade for a gas turbine engine, comprising:
   an inner ply layer group that at least partially defines a base of a root region, wherein the base is a bottommost surface of the root region;
   a platform that comprises at least two platform sections, which, in combination, define the platform and surround the inner ply layer group; and
   a platform over-wrap around the platform, the platform over-wrap formed as a continuous band that wraps around the at least two platform sections.

2. The blade as recited in claim 1, wherein the inner ply layer group at least partially defines an airfoil.

3. The blade as recited in claim 1, wherein the inner ply layer group, the platform, and the platform over-wrap comprise a flared surface of the root region of the rotor blade.

4. The blade as recited in claim 1, wherein the inner ply layer group and the platform over-wrap are manufactured of a ceramic matrix material.

5. The blade as recited in claim 1, wherein the inner ply layer group, the platform, and the platform over-wrap comprise a ceramic matrix material.

6. The blade as recited in claim 1, wherein the platform over-wrap defines an attachment surface at which a disk interfaces.

7. The blade as recited in claim 6, wherein the attachment surface defines a zone of compression through the platform over-wrap and into said inner ply layer group.

8. The blade as recited in claim 7, wherein the zone of compression is defined along a line that is oriented at 30-50 degrees with respect to a blade root centerline.

9. The blade as recited in claim 7, wherein a point on a centerline of the blade is defined by a line perpendicular to an attachment surface and extending from a point in the zone of compression of the attachment surface, the base of the root region defined below the point on the centerline.

10. The blade as recited in claim 9, wherein the point in the zone of compression is a central point on the attachment surface that defines the zone of compression.

11. The blade as recited in claim 9, wherein the point in the zone of compression is a bottommost point on the attachment surface that defines the zone of compression.

12. The blade as recited in claim 1, wherein the base is perpendicular to a centerline of the blade.

13. The blade as recited in claim 1, wherein an outer surface of the platform over-wrap below an attachment surface is parallel to a blade root centerline.

14. The blade as recited in claim 1, wherein an outer surface of the platform over-wrap below an attachment surface forms an inward angle toward a centerline of up to about 10 degrees.

15. A method of manufacturing a rotor blade of a gas turbine engine, comprising:
    assembling a platform around an inner ply layer group, the platform and the inner ply layer group at least partially forming a base of a root region, wherein the base is a bottommost surface of the root region;
    wrapping the platform with a platform over-wrap, the platform comprises at least two platform sections which, in combination, define the platform and surround the inner ply layer group, the platform over-wrap at least partially forming the base; and
    forming the platform over-wrap as a continuous band that wraps around the at least two platform sections.

16. The method as recited in claim 15, further comprising forming an attachment surface with the platform over-wrap.

17. The method as recited in claim 15, further comprising applying a silicon plasma spray to form a machinable layer on an attachment face.

18. The method as recited in claim 15, further comprising forming a flared surface with the platform, the inner ply layer group, and the platform over-wrap.

* * * * *